(12) United States Patent
Murray (10) Patent No.: US 6,321,333 B1
(45) Date of Patent: Nov. 20, 2001

(54) EFFICIENT DIGITAL CERTIFICATE PROCESSING IN A DATA PROCESSING SYSTEM

(75) Inventor: Eric Murray, Los Gatos, CA (US)

(73) Assignee: Wave Systems Corporation, Lee, MA (US)

( * ) Notice: Subject to any disclaimer, the term of this patent is extended or adjusted under 35 U.S.C. 154(b) by 0 days.

(21) Appl. No.: 09/173,474

(22) Filed: Oct. 14, 1998

(51) Int. Cl.⁷ ...................................................... G06F 1/24
(52) U.S. Cl. ............................................ 713/156; 713/168
(58) Field of Search ..................................... 713/156, 168, 713/175, 176, 180

(56) References Cited

PUBLICATIONS

Menezes, "Handbook of Applied Cryptography", 1996, sec. 13.6.3, 13.4.5, 13.6.2.*

* cited by examiner

*Primary Examiner*—Thomas R. Peeso
(74) *Attorney, Agent, or Firm*—Baker Botts L.L.P.

(57) ABSTRACT

The present invention is directed toward efficient digital certificate processing. In one aspect a system for efficient digital certificate processing comprises a computer and a secure certificate cache coupled to a computer. The secure certificate cache stores pre-verified digital certificates. In a second aspect, a method for efficient digital certificate processing in a data processing system comprises providing a secure certificate cache and receiving a digital certificate. The method further includes determining if the digital certificate is within the secure certificate cache. The method finally includes verifying the validity of the digital certificate if the digital certificate is within the secure certificate cache. The system and method in accordance with the present invention provides efficient processing of digital certificates in that it advantageously avoids unnecessary repetitive verification of commonly used digital certificates and also requires less memory to verify a certificate chain than conventional systems. Pre-verified digital certificates are maintained in the secure certificate cache to facilitate accelerated certificate chain validation and avoid repeat verification in the future.

19 Claims, 5 Drawing Sheets

EFFICIENT DIGITAL CERTIFICATE PROCESSING IN A DATA PROCESSING SYSTEM

RELATED APPLICATIONS

"Efficient Digital Data Encoding in a Data Processing System," is a co-pending application assigned to the assignee of the present application, serial number 1126P, filed Sep. 30, 1998.

FIELD OF THE INVENTION

The present invention relates to electronic transactions in a computer system and more particularly to efficiently processing digital certificates for the electronic transactions in a secure environment within the computer system.

BACKGROUND OF THE INVENTION

Computer networks have emerged as a principal medium for conducting electronic commerce and other types of electronic transactions. However, computer networks provide an environment which is fraught with security breaches that allow computer hackers or rogue programs to compromise the integrity and validity of digital data processing applications including electronic transactions. As a result, electronic transaction protocols and digital certificate technologies have emerged for entity authentication purposes.

For example, electronic commerce transaction protocols utilize message construction methods for encoding the messages. Typically, these methods are transparent to the operating environment and allow encoding of messages to occur uniformly without regard to the type of operating system within a particular computer system. One such method, known as Tag-Length-Value (TLV) encoding, is described in co-pending application Serial No. (1126P), entitled "Efficient Digital Data Encoding in a Data Processing System," filed Sep. 30, 1998, and assigned to the assignee of the present application.

Digital certificates are commonly used in digital data processing applications, including multi-party electronic transactions, as a mechanism for verifying the identity of entities which use them. Entities use their given identities in communicating with each other when participating in electronic transactions, including electronic commerce.

Digital certificate technology commonly uses a hierarchical organization of digital certificates in which a root certificate ranks at the top and other digital certificates rank below it. In this hierarchical organization, each digital certificate is signed by an issuer which ranks above it. The issuers certificate, in turn, is signed by its issuer who ranks above it. This mechanism goes up the chain of hierarchy to the root certificate which is a self-signed certificate. The signing of digital certificates is akin to authorization of the digital certificates. The root certificate is commonly trusted by all entities which use the certificate hierarchy that the root presides over.

Verifying a chain of digital certificates up to the root certificate is known as certificate chain verification. In a conventional digital certificate technology based system the certificate chain verification must be performed every time a digital certificate is received thereby. To verify digital certificates, conventional data processing environments utilizes significant amounts of memory space and consume numerous processor cycles. The more complex the digital certificate hierarchy is, the more resources the certificate chain verification consumes.

Hence, what is needed is a method and system for efficient digital certificate processing which overcomes the above-described deficiencies of conventional data processing systems. Moreover, a method and system is needed for efficient certificate processing which is safeguarded against attack by unauthorized participants and rogue programs. Furthermore, the system and method for efficient digital certificate processing needs to be easily implemented in a cost effective manner. These needs are addresses by the present invention as set forth herein below.

SUMMARY OF THE INVENTION

The present invention is directed toward efficient digital certificate processing. In one aspect a system for efficient digital certificate processing comprises a computer and a secure certificate cache coupled to a computer. The secure certificate cache stores pre-verified digital certificates.

In a second aspect, a method for efficient digital certificate processing in a data processing system comprises providing a secure certificate cache and receiving a digital certificate. The method further includes determining if the digital certificate is within the secure certificate cache. The method finally includes verifying the validity of the digital certificate if the digital certificate is within the secure certificate cache.

The system and method in accordance with the present invention provides efficient processing of digital certificates in that it advantageously avoids unnecessary repetitive verification of commonly used digital certificates and also requires less memory to verify a certificate chain than conventional systems. Pre-verified digital certificates are maintained in the secure certificate cache to facilitate accelerated certificate chain validation and avoid repeat verification in the future.

DETAILED DESCRIPTION OF THE INVENTION

The present invention relates to electronic transactions in a computer system. More particularly, the present invention relates to efficiently processing digital certificates for electronic transactions in a secure environment within the computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
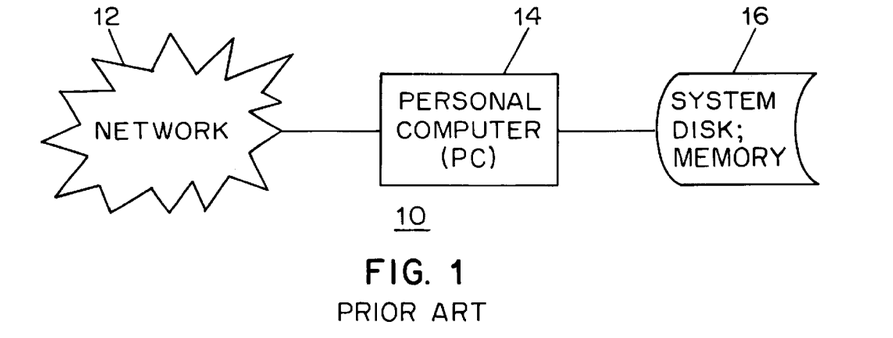
FIG. 1 is a block diagram of a conventional system for performing electronic transactions.

Transactions conducted in a data processing system are commonly referred to as electronic transactions. Electronic transactions are typically conducted over a computer network through which data processing systems communicate with each other. FIG. 1 is a block diagram of a conventional data processing system 10 for performing electronic transactions.

As illustrated in FIG. 1, the system 10 includes a personal computer or workstation (computer) 14 which is equipped with a computer disk and memory (disk) 16. The computer 14 is linked to other computers (not shown) through the network 12. The network 12 can be a local area network or a public network such as the Internet.

A majority of the data processing application programs for conducting electronic transactions (electronic transactions applications) execute on conventional operating system platforms, such as OS/2, Windows, UNIX etc., which do not provide a secure computing environment for executing electronic transaction applications. Accordingly, there is a need for preserving the integrity and protecting the validity of electronic transactions.

A system and method in accordance with the present invention builds upon digital certificate technology as an authentication technique. A system and method in accordance with the present invention provides efficient processing of digital certificates in that it advantageously avoids unnecessary repetitive verification of commonly used digital certificates. Pre-verified digital certificates are maintained in a secure cache memory in order to facilitate accelerated certificate chain validation and avoid repeat verification in the future. The secure cache memory for holding the pre-verified digital certificates is hereafter referred to as a secure certificate cache. It should be understood that although the preferred embodiment of this invention is directed toward electronic commerce and X.509 certificates, the principles described herein equally applies to other embodiments without departing from the scope and spirit of the present invention.

Digital certificates are commonly used for authentication in multi-party electronic transactions. Digital certificates are a mechanism for providing and verifying the digital identities of entities which participate in electronic transactions. Entities use their given digital identity in communicating with each other when conducting electronic transactions.

Authentication of electronic transactions using digital certificates is typically associated with public-key cryptography algorithms which utilize a key-pair of a public key and a private-key. The public-key is data available in the public domain. The private-key is sensitive data personal to its owner. Private-keys can be provided to individuals, for example, via smart cards issued to them by organizations such as banks, credit companies etc.

A digital certificate is used to verify that a public-key belongs to a particular entity.

Figure 2A:
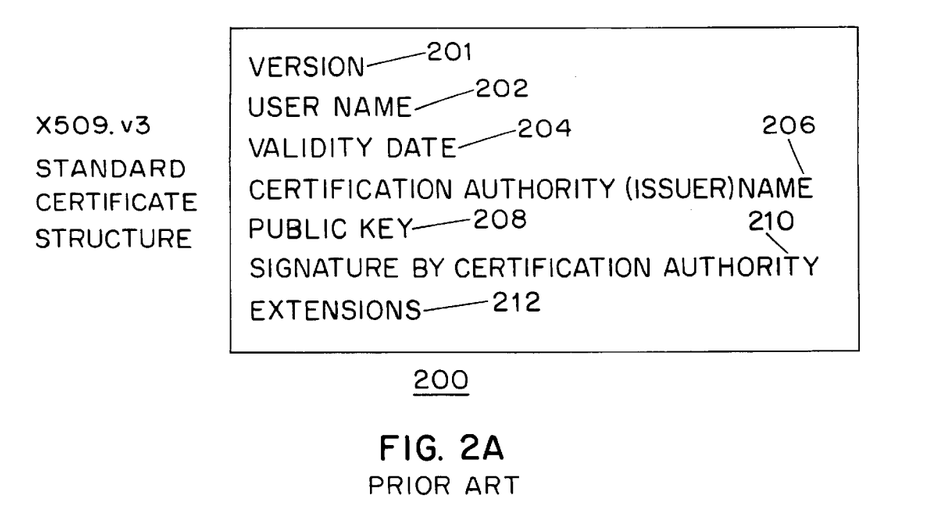
FIG. 2A is a diagram of a conventional certificate structure.

FIG. 2A is a diagram of a conventional digital certificate structure. A conventional certificate structure conforms, for example, with the X509.v3 standard certificate structure.

An X.509 digital certificate 200 includes fields such as a version designation 201, a user name 202, a certificate validity date 204, a public-key 208, and extensions 212.

The validity date 204 includes one or both of a before date and an after date. Before and after dates comprise a validity start date and a validity stop date, respectively. The public-key is signed by a mutually trusted authority (i.e., trusted by the public-key user and his transacting party). The mutually trusted authority, commonly known as the certificate authority or issuing authority 206, authenticates the public-key user identity by providing a signature 210, thereby verifying that the public-key really belongs to the public-key user. Typically, the signature 210 applies to all of the above-enumerated information segments.

In addition, the extensions 212 can set forth restrictions on the use of the private key which accompanies the public key. For example, the certificate authority's certificate may be restricted by the extensions to be used to verify signatures for five years and to sign digital certificates for one year.

With public-key cryptography, an electronic transaction message, encrypted or unencrypted, can be "signed" with the private-key and transmitted to an addressee. Then, the addressee, or anyone having the public-key, can use the public-key to decipher the message and verify that the owner of the corresponding private key sent it.

Digital certificate technology commonly uses a hierarchical organization of digital certificates in which a root certificate ranks at the top and other digital certificates rank below it. In this hierarchical organization, each digital certificate is signed by an issuer which ranks above it. The issuer's certificate, in turn, is signed by its issuer who ranks above it. This mechanism goes up the chain of hierarchy to the root certificate which is a self-signed certificate. The signing of digital certificates is akin to authorization of the public key in those digital certificates. The root certificate belongs to the most trusted issuing or certification authority. All entities participating in the certificate hierarchy are required to trust the root certificate authority's signatures on certificates.

Verifying a chain of digital certificates up to the root certificate is known as certificate chain verification. In a conventional digital certificate technology based system which uses trusted root certificate authorization, the certificate chain verification must be performed every time a digital certificate is received thereby. To verify digital certificates, conventional data processing environments utilizes significant amounts of memory space and consume numerous processor cycles. The more complex the digital certificate hierarchy is, the more resources and time are consumed by the certificate chain verification.

Figure 2B:
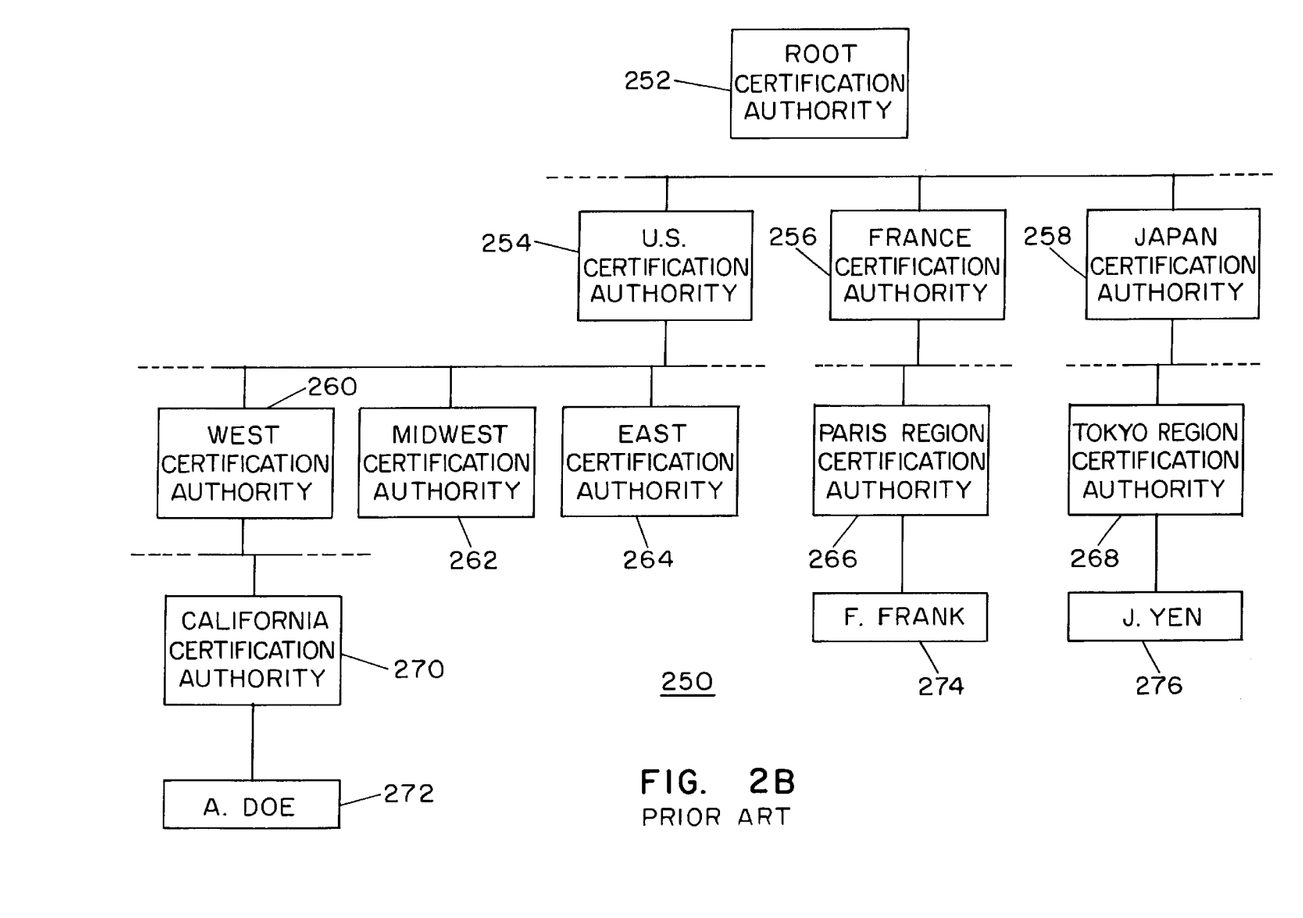
FIG. 2B is a diagram of a conventional certificate chain for authenticating electronic transactions.

FIG. 2B is a diagram of a certificate hierarchy for authenticating electronic transactions. A certificate hierarchy 250 having a root certification authority 252 create a certificate chain which allows individuals in different countries and regions to electronically transact with each other. The root certification authority 252 allows certification authorities in various countries, and regions within those countries, to issue by way of the digital certificates digital identities to individuals. The certificate chain creates a trust relationship where trust flows through the certificate hierarchy upwards from each transaction party's digital certificate to the root certification authority 252.

For example, there may be a Japanese certification authority 258, a French certification authority 256, and a U.S. certification authority 254, each issuing digital identities to Japanese, French and U.S. residents, respectively. In Japan, a Tokyo region certification authority 268 may issue a digital identity 276 to J. Yen. In France, a Paris region certification authority 266 may issue a digital identity 274 to F. Frank. In the U.S., there may be an Eastern certification authority 264, a Mid-western certification authority 262 and a Western certification authority 260. The Western certification authority 260 may issue a digital identity to a California certification authority 270 which, in turn, may issue a digital identity 272 to A. Doe.

When A. Doe, a California resident, wants to exchange messages with J. Yen in Japan and/or with F. Frank in France, A. Doe needs to be sure that the electronic transactions are conducted with J. Yen and/or F. Frank and not with imposters. Through existing digital certificate technology, it is possible to verify the digital identity of a sender of transaction messages by traversing upwards through the certificate chain. In checking the digital certificate in a message, A. Doe can check if there is a valid digital identity in the corresponding digital certificate. That is, A. Doe can check if in a message from J. Yen there is a certificate with a valid certification authority signature of the Tokyo region certification authority 268. Then A.Doe would obtain the certificate from the Japan certification authority 258 and check that the signature on it from its issuer, the root certificate authority 252, is valid. Then A.Doe would check the root certificate itself, verifying that it is the root certificate from the root certificate authority 252 which A.Doe trusts for this particular kind of message, and that the root certificate's signature is valid.

Figure 3:
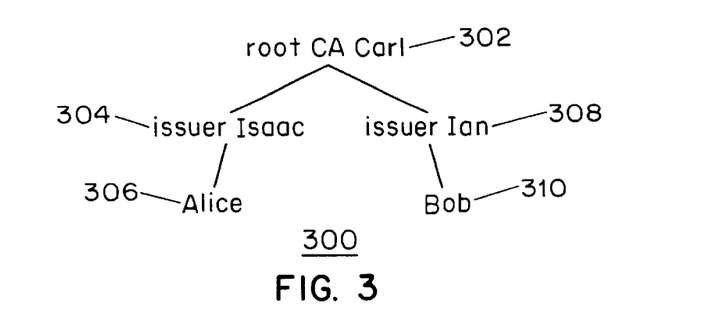
FIG. 3 is a diagram of a certificate hierarchy illustrating certificate chain verification.

A certificate chain verification process can be illustrated by the example of a certificate hierarchy provided in FIG. 3. In this exemplary hierarchy 300, the root certificate 302 is issued (self-signed) by and belongs to CA Carl. CA Carl 302 issues a certificate to Isaac 304 and Isaac 304, in turn, is the issuer of Alice's certificate 306. In a similar manner, CA Carl issues a certificate to Ian 308 and Ian 308, in turn is the issuer of Bob's certificate 310. The root certificate of CA Carl 302 and its associated private and public keys are trusted by all the certificate holders in the hierarchy.

When a party, Alice 306, receives a certificate from another party, Bob 310, in the same certificate hierarchy, Alice 306 needs to verify Bob's 310 certificate. To that end, Alice 306 first obtains Ian and Carl's certificates 308 and 310. Alice 306 then uses the public key in Ian's certificate 308 to decode Ian's signature on Bob's certificate 310 and verify it. If Bob's certificate 310 verifies, Alice 306 then uses the public key in CA Carl's certificate 302 to verify CA Carl's signature on Ian's certificate 308. If verified, Alice 306 then uses CA Carl's public-key to verify CA Carl's certificate 302 and, additionally, verify that CA Carl's certificate 302 is indeed the certificate from the root authority whom Alice 306 knows and trusts. Hence, by this process Alice 306 performs a certificate chain verification from Bob 310 to CA Carl 302.

Once Alice 306, has verified the certificate chain from Bob 310 to CA Carl 302, the trusted root certification authority, Alice 306 can be confident that Bob's certificate 310 is "good." The term "good" has an import assigned to it by CA Carl 202. Hence, "good," as defined and enforced by CA Carl 302, determines the metes and bounds of the transactions for which Bob's certificate 310 is good—that is, the types of transactions Bob 310, or anyone else in the hierarchy, is entitled to participate in with this certificate key pair.

To transact with Alice 306, Bob 310, in turn, similarly performs a certificate chain verification from Alice 306 to CA Carl 302. That is, Bob 310 obtains Isaac's and CA Carl's certificates 304 and 302. Bob 310 then verifies Isaac's signature on Alice's certificate 306, and CA Carl's signature on Isaac's certificate 304. Bob 310 additionally verifies CA Carl's signature and certificate 302 as being that of the known and trusted root certification authority. Once Bob 310, has verified the certificate chain from Alice 306 to CA Carl 302, Bob 310 can be confident that Alice's certificate 306 is "good" and the transaction can proceed.

As indicated, the complexity of the certificate chain verification and the consumption of resources thereby increases with the increase in complexity of the hierarchy. In other words, algorithms such as public-key cryptography for authenticating identities of sender and addressee are complex and time consuming. The longer the certificate chain which must be verified, the more expensive public-key operations which must be performed. In addition, since the compromise of a root certificate authorities key would compromise the entire certificate hierarchy, root certificates often use longer keys to increase the protection of the root certificate. Longer keys require more processing power to verify.

Hence, to avoid the need for unnecessary repeat verifications and the overhead expense associated with commonly-used certificates in the same hierarchy, once verified, their data is stored in the certificate cache for future use. The saving of time and resources by this approach becomes more readily apparent when large volumes of transactions are being performed.

For example, in a credit card purchase transaction, each of the cardholder, the merchant, and the bank or credit card company, must perform a certificate chain verification to authenticate the source of the each messages they receive. Taking the previously illustrated hierarchy 200 and expanding it to create a hierarchy 350 as shown in FIG. 4, the certificate chain verification in the credit card purchase transaction can be demonstrated.

Figure 4:
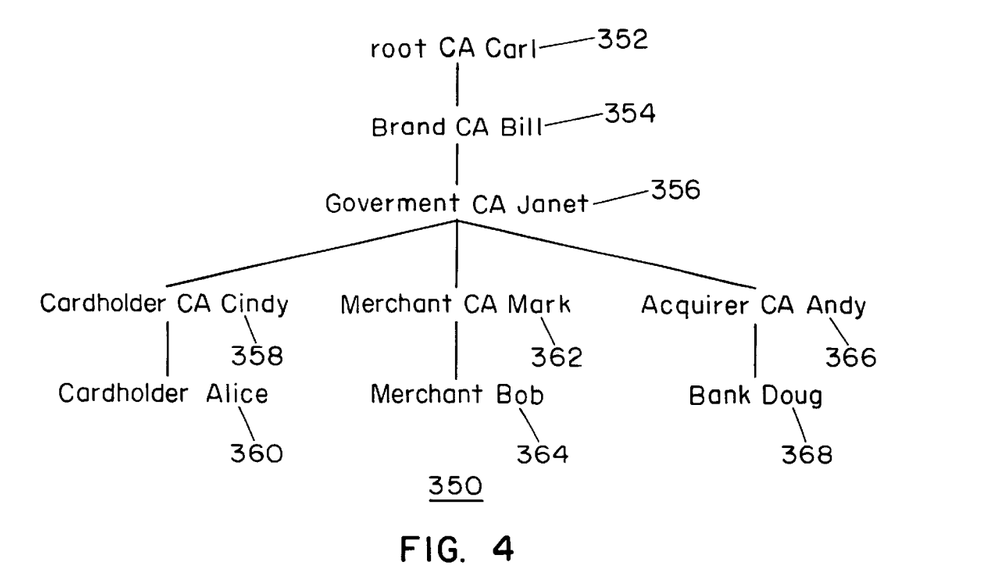
FIG. 4 is a diagram of a certificate hierarchy demonstrating certificate chain verification in a credit card purchase transaction.

As illustrated in FIG. 4, Cardholder Alice's certificate 360 is issued and signed by Cardholder CA Cindy 358. Cardholder CA Cindy's certificate 358 is issued by Government CA Janet 356 and it, in turn, is issued by Brand CA Bill 354. Brand CA Bill's certificate 354 is issued by the well-known and commonly-trusted root certification authority CA Carl which self-signs its own certificate 352. The other branches of the tree leading to Bank Doug 368 and merchant Bob 364 are similarly organized.

When Cardholder Alice 360 makes a purchase from Merchant Bob, she communicates with Merchant Bob and Bank Doug, all of whom must exchange authenticated transaction messages. Hence, Cardholder Alice 360 verifies Merchant Bob's certificate 364 to authenticate his identity by performing a certificate chain verification from Merchant Bob's certificate 364, through each certificate in the chain to the root certificate of CA Carl 352. Cardholder Alice 360 performs also a certificate chain verification from Bank Doug's certificate 368 to the root certificate of CA Carl 352.

Merchant Bob 364, in turn, performs a certificate chain verification from cardholder Alice's certificate 260 to the root certificate CA Carl 352, and from Bank Doug's certificate 368 to the root certificate of CA Carl 352. Bank Doug 368 performs the verification from cardholder Alice's certificate 360 to the root certificate of CA Carl 352, and from Merchant Bob's certificate 364 to the root certificate of CA Carl 352. Hence, in this example, the certificate chain verification is performed 6 times.

In large volume multi-party transactions using certificates under a mutual trusted root certificate, many of the certificates are present in more than one chain. Therefore, the present invention, as before mentioned, provides for efficient processing of digital certificates in that it advantageously avoids cryptographic verification of commonly-used digital certificates by maintaining pre-verified commonly-used digital certificates in the certificate cache in order to facilitate future verification-validation. Verifying certificate chains using a certificate cache consumes less memory. As each certificate is verified, it is placed in the cache. A cached certificate no longer needs the signature of the issuer, making the cached certificate smaller. Additionally, many certificate extensions can be verified at the time that the certificate is verified/validated and accepted into the cache, meaning that those extensions do not need to be placed in the cache. This further decreases the memory needed to store cached certificates, and therefore the memory required to validate a certificate chain.

Figure 5:
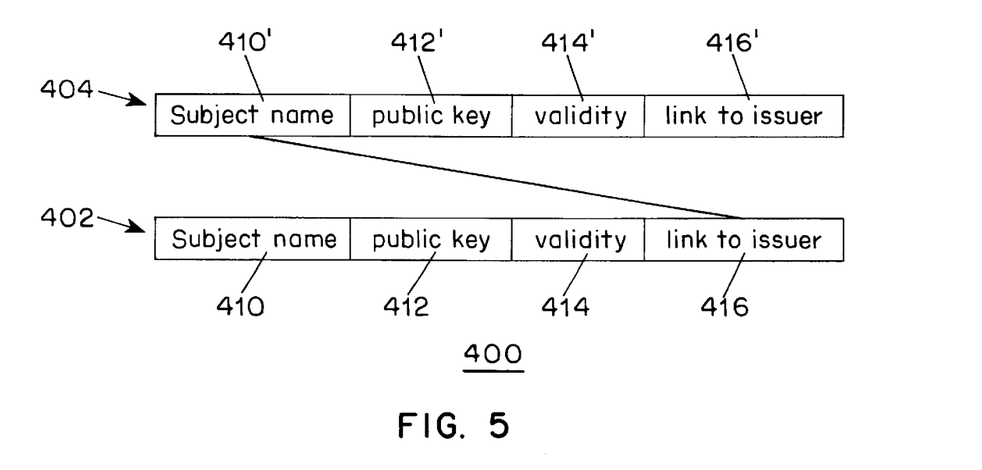
FIG. 5 illustrates the contents of the certificate cache in accordance with the present invention.

FIG. 5 illustrates the contents of the certificate cache. The contents 400 of the certificate cache includes a subordinate certificate 402 and the certificate of its issuer 404, both of which have been verified. In addition to the name 410 and 410', public-key 412 and 412' and validity 414 and 414' data, each certificate (whether issuer 404 or subordinate 402 thereto) is linked to its issuer through a corresponding "link to issuer" field 416 and 416'. Thus, through the "link to issue" field 416 the subordinate certificate 402 is linked to its issuer 404. The issuer certificate 404 is firther linked to its issuer (not shown) which is either another issuer or the root certification authority.

To provide a secure environment which prevents the certificate cache from unauthorized modification, the present invention uses a certificate cache which is located in a secure computing environment. By locating the certificate cache in the secure environment and preventing unauthorized access to the certificate cache, the verified certificates can be trusted because they cannot be tampered with by adding a false certificate or by modifying one of the certificate cache entries.

Figure 6:
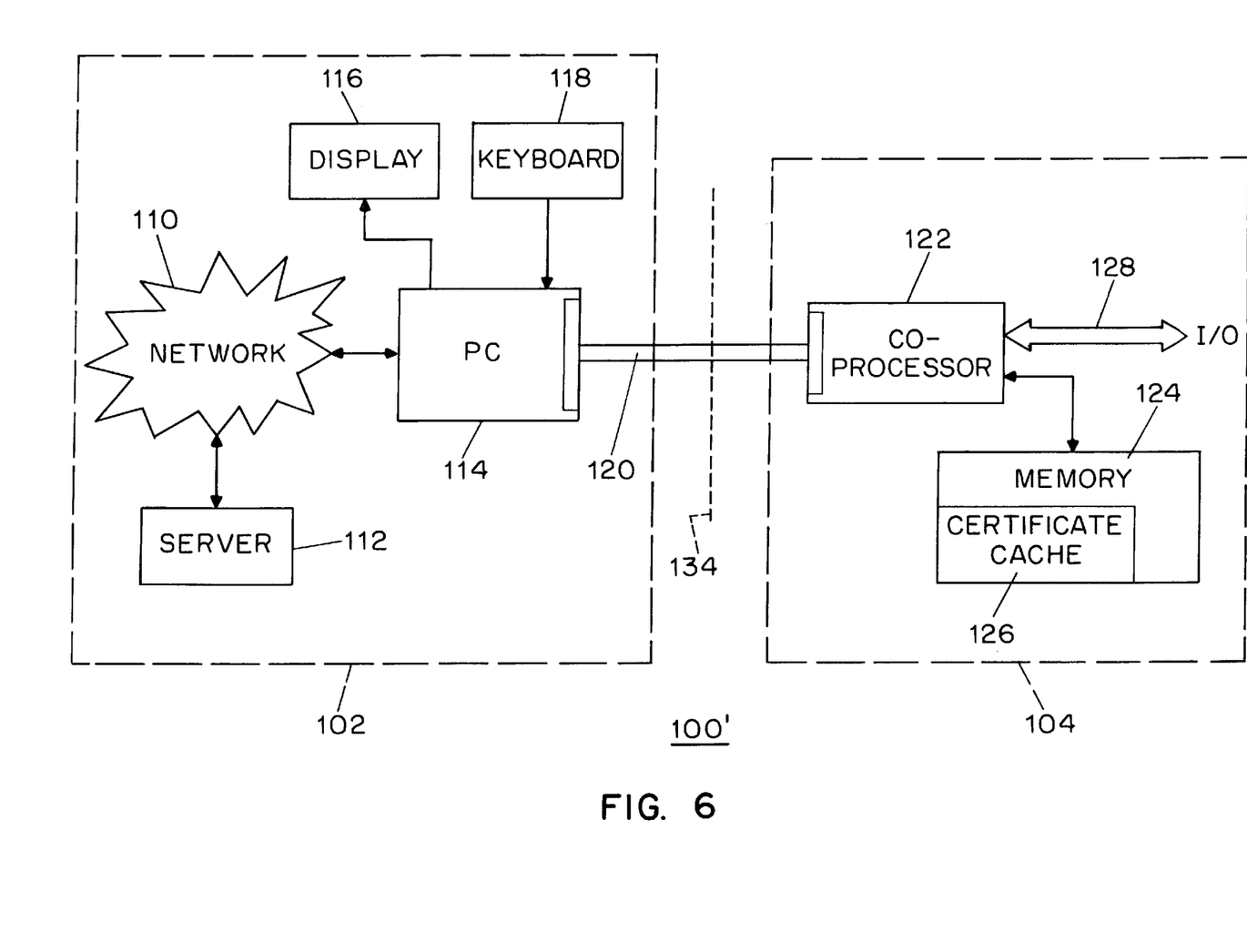
FIG. 6 is a block diagram illustrating one embodiment of a data processing system with a secure computing environment.

FIG. 6 is a block diagram illustrating one embodiment of a data processing system 100 with a secure computing environment. The secure computing environment 104 is spaced apart from the traditional non-secure computing environment 102 by a host interface 120 which includes a virtual firewall interface 134 for preventing unauthorized access to the secure computing environment 104. In the data processing system 100, processing is distributed between the secure and traditional non-secure computing environments 102 and 104, respectively. In using this configuration, electronic transaction applications can be executed in whole or in part outside the traditional computing environment 102 and hence outside the reach of computer hackers and rogue programs. Execution of non-secure portions of electronic transaction applications can continue in the traditional computing environment 102, while the secure portion of these applications is executed in the secure computing environment 104.

The certificate cache 126 is provided within the secure computing environment 104. This configuration prevents compromise of the certificate cache 126 which could result from adding the false certificate(s) or modifying one of the certificates. The certificate cache 126 holds the approved digital certificates which, by reason of the virtual firewall interface 134, cannot be compromised.

As is further illustrated in FIG. 6, the secure computing environment 104 preferably includes a co-processor 122 which is linked to the computer 114 by the host interface 120. The computer 114 is connected to the network 110.

It should be understood that the location of the co-processor 122 can vary and, without departing from the scope and spirit of the present invention, it can be fixed inside or outside the computer 114 or the keyboard 118, as long as the secure computing environment 104 is logically separated from the traditional non-secure computing environment 102. It should further be understood that the secure memory that is required for the certificate cache need not be maintained or accessed through a co-processor, as long as it is secure against unauthorized modification when compared to the usual computer memory.

The co-processor 122 interfaces with a secure memory 124 including the secure certificate cache 126. The co-processor 122 can further interface with additional peripheral devices such as an additional display and keyboard via the input-output (I/O) interface 128. In the secure computing environment 104, the co-processor 122, the additional peripheral devices, if present, and the secure memory are "trusted" devices because their operations cannot be tampered with by unauthorized access.

In operation, confidential data is preferably encrypted and/or wrapped in cryptographically signed messages inside the secure computing environment 104. The encrypted confidential data and/or cryptographically signed messages are then passed to the traditional computing environment 102 of the computer 114 for completion of the electronic transaction processing. The computer 114 sends transaction information containing the cryptographically signed message to another computer (not shown) linked to it through the network 110. The other computer is preferably equipped with comparable security mechanism for decrypting the message, including a secure environment with a certificate cache for storing pre-verified commonly used certificates.

Thus, in the data processing system 100, and any system configured similarly, the confidential data is not processed by the computer 114 in the traditional computing environment 102 and it is therefore not susceptible to attack.

In order to implement the above-mentioned distributed processing, the virtual firewall interface 134 within the host interface 120 restricts data traffic through the host interface 120 so that the computer 114 does not have access to confidential data while being processed in the secure computing environment 104. For example, the virtual firewall interface 134 prevents the computer 114 from commanding the co-processor 122 to allow the computer 114 to read from secure memory 124 and, in turn, the certificate cache 126. Conversely, the virtual firewall interface 134 allows the computer 114 to command the security co-processor 122 to perform certain other transactions (no matter how much attack software is present in the computer 114).

The functionality of the virtual firewall interface 134 is generally enforced by a well-known application programming interface (API) which defines how the computer 114 and the security co-processor 122 may communicate with each other. When a certificate is received, it may be passed through the API to be processed in conjunction with the secure certificate cache for verification and storage of the appropriate portions of the certificate in the secure certificate cache.

Figure 7:
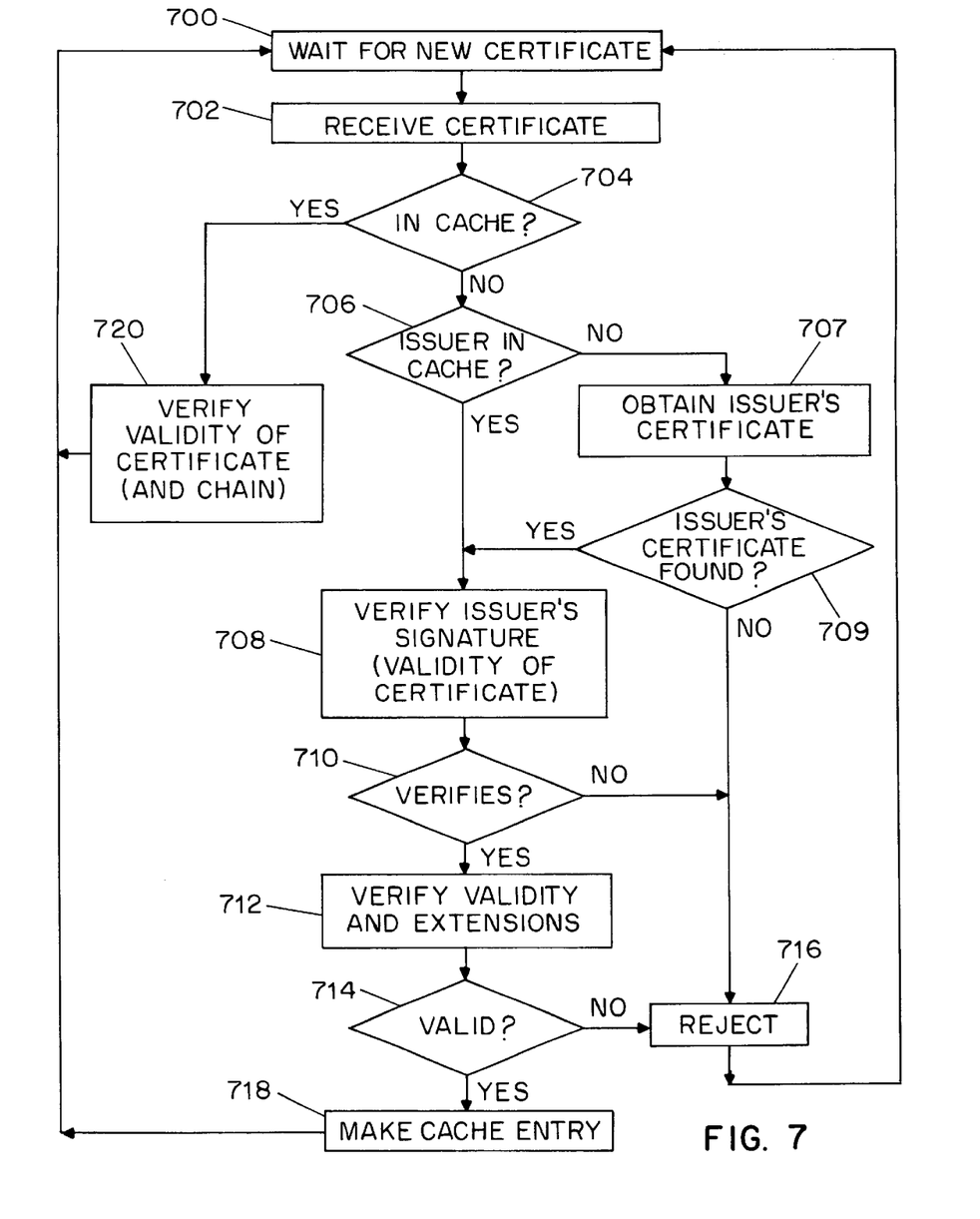
FIG. 7 is a flow diagram illustrating the building of a certificate cache.

FIG. 7 is a flow diagram illustrating the building of a secure certificate cache. Building the secure certificate cache includes adding new entries of digital certificates. This process begins by waiting for a new digital certificate, via step 700. With each new digital certificate, the process repeats. Once a new digital certificate is received, via step 702, it is compared against the contents of the secure certificate cache, via step 704. If the new digital certificate exists in the secure certificate cache, the digital certificate and any extensions are validated, via step 720. Alternatively, if the new digital certificate is not found in the secure certificate cache, via step 704, then it is determined if the certificate of the issuing certificate authority (issuer) exists in the secure certificate cache, via step 706. If the issuer's certificate does not exist in the secure certificate cache, the issuer's certificate is obtained, via step 707. Typically, the issuer's certificates in the hierarchy are sent together with the new certificate. Thus the list of certificates can be accessed to obtain the issuer's certificate if it is not present in the secure certificate cache. Alternatively, on-line look-up directories are available and can be accessed to obtain the issuer's certificate. However, if it is determined that the issuer's certificate can not be found, via step 709, then the new digital certificate is rejected, via step 716. Then, the building of the secure certificate cache returns to wait for another new digital certificate, via step 700.

Alternatively, if the issuer's signature exists in the secure certificate cache, or it has been determined, via step 709, that it was found, the issuer's signature is then verified, via step 708. It is then determined if the issuer's signature can be verified as a signature on the certificate, via step 710. If the issuer's signature does not verify, via step 710, then the new digital certificate is rejected, via step 716. Then, the building of the secure certificate cache returns to wait for another new digital certificate, via step 700.

If, the issuer's signature is verified, via step 710, then the validity and extensions of the new digital certificate are verified as shown in the digital certificate of FIG. 2A, via step 712. If the digital certificates are valid, via step 712, then a corresponding entry with the new digital certificate data is made in the secure certificate cache, via step 718.

Alternatively, if the new digital certificate and extensions are verified, via step 712, and are then found to be invalid (i.e., not yet activated or expired) or to contain an invalid extension, via step 714, then the new digital certificate is rejected, via step 716. Then, the building of the secure certificate cache returns to wait for another new digital certificate, via step 700. Accordingly, the building of the certificate cache saves memory used for certificate chain verification.

In addition to building the secure certificate cache, during execution of electronic transaction applications, the secure certificate cache is suitably maintained in order to remove stale (aged) certificates and thereby save space. That is, secure certificate cache entries are removed from the secure certificate cache if they expire or have not been used recently. In either case, when certificates are removed, all their subordinate certificates—that is, all the certificates they issued, and all the certificates those certificates have issued, etc—are removed as well, even if they have not yet expired.

The above-described implementation of building and maintaining the secure certificate cache is a preferred approach to accomplishing efficient processing of digital certificates. However, it should be understood that the efficient processing of digital certificates, namely, the advantageous pre-approving and saving of their data in a secure environment, can be accomplished using other suitable techniques without departing from the scope and spirit of the present invention.

Finally, whichever approach is used, the time and resources saving during processing of digital certificates is manifested in that the pre-approved commonly-used certificates data which is saved in the secure certificate cache, is advantageously used for accelerated verification-validation in future electronic transaction operations.

One advantage of the foregoing gradual building of the certificate cache and the accelerated verification of pre-verified digital certificates whose data is stored in the certificate cache, is the secure and efficient processing of digital certificates. This technique is performed in a secure environment for providing an uncompromised and trusted efficient processing of digital certificates.

A method and system have been disclosed for secure and efficient digital certificate processing in a data processing system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for efficient digital certificate processing comprising:

a computer; and a secure certificate cache coupled to the computer, the secure certificate cache for storing pre-verified digital certificates.

2. The system of claim 1 wherein the computer includes:

means for receiving a digital certificate;

means for determining whether the digital certificate is within the secure certificate cache; and means for verifying the validity of the digital certificate if the digital certificate is within the secure certificate cache.

3. The system of claim 2 wherein the computer further includes:

means for determining whether an issuer digital certificate exists in the secure certificate cache if the digital certificate cache is not in the secure certificate cache;

first means for verifying that signature for the issue digital certificate exists in the secure certificate cache if issuer digital certificate exists in the secure certificate cache;

second means for verifying the validity and extensions of the digital certificate responsive to the first verifying means; and means for providing a cache entry in the secure certificate cache responsive to the digital certificate being valid.

4. The system of claim 3, wherein the validity and extensions comprise the start and stop dates on the digital certificate.

5. A method for efficient digital certificate processing in a data processing system comprising the steps of:

a) providing a secure certificate cache for storing digital certificates which have been validated;

b) receiving a digital certificate;

c) determining if the received digital certificate is within the secure certificate cache; and d) validating the received digital certificate if the digital certificate is within the secure certificate cache.

6. The method of claim 5, further comprising the step (e) of performing a certificate chain verification if the received digital certificate is not within the secure certificate cache.

7. The method of claim 6, wherein step (e) further includes the steps of:

e) determining whether an issuer digital certificate exists in the secure certificate cache if the digital certificate is not in the secure certificate cache;

f) verifying that a signature for the issuer exists in the secure certificate cache if the issuer digital certificate exists in the secure certificate cache;

g) verifying the validity and extensions of the digital certificate if the signature exists in the secure certificate cache; and h) providing a cache entry in the secure certificate cache responsive to the digital certificate being valid.

8. The method of claim 7 wherein the validity and extensions comprise the start and stop dates on the digital certificate.

9. A system for efficient digital certificate processing comprising:

a non-secure computing environment;

a secure computing environment;

a host interface coupled between the non-secure computing environment and the secure computing environment by the host interface so that access by the non-secure computer environment to data processed in the secure environment is restricted; and a certificate cache within the secure computing environment, the certificate cache coupled to the host interface for storing pre-verified digital certificates.

10. The system of claim 9 wherein the secure computing environment includes:

means for receiving a digital certificate;

means for determining whether the digital certificate is within the secure certificate cache; and means for verifying the validity of the digital certificate if the digital certificate is within the secure certificate cache.

11. The system of claim 9 wherein the secure computing environment further includes:

means for determining whether an issuer digital certificate exists in the secure certificate cache if the digital certificate cache is not in the secure certificate cache;

first means for verifying that signature for the issue digital certificate exists in the secure certificate cache if issuer digital certificate exists in the secure certificate cache;

second means for verifying the validity and extensions of the digital certificate responsive to the first verifying means; and means for providing a cache entry in the secure certificate cache responsive to the digital certificate being valid.

12. The system of claim 11, wherein the validity and extensions comprise the start and stop dates on the digital certificate.

13. The system of claim 12, wherein the secure computing environment further includes a co-processor coupled between the host interface and the certificate cache for controlling secure data processing.

14. The system of claim 13, wherein the host interface further includes a virtual firewall interface for implementing the restriction of access to data processed in the secure environment including the digital certificates data stored in the secure certificate cache.

15. The system of claim 14, wherein the virtual firewall interface includes an interface communication protocol for managing digital certificates.

16. A computer readable medium containing program instructions for efficient digital certificate processing in a data processing system, the program instructions for:

providing a secure certificate cache;

receiving a digital certificate;

determining if the digital certificate is within the secure certificate cache; and verifying the validity of the digital certificate if the digital certificate is within the secure certificate cache.

17. The computer readable medium of claim 16 which includes program instructions for performing a certificate chain verification.

18. The computer readable medium of claim 17 which includes program instructions for:

determining whether an issuer digital certificate exists in the secure certificate cache if the digital certificate is not in the secure certificate cache;

verifying that a signature for the issuer exists in the secure certificate cache if the issuer digital certificate exists in the secure certificate cache;

verifying the validity and extensions of the digital certificate if the signature exists in the secure certificate cache; and providing a cache entry in the secure certificate cache responsive to the digital certificate being valid.

19. The computer readable medium of claim 18 wherein the validity and extensions comprise the start and stop dates on the digital certificate.

* * * * *

UNITED STATES PATENT AND TRADEMARK OFFICE
CERTIFICATE OF CORRECTION

PATENT NO.    : 6,321,333 B1  Page 1 of 1
DATED         : November 20, 2001
INVENTOR(S)   : Eric Murray It is certified that error appears in the above-identified patent and that said Letters Patent is hereby corrected as shown below:

Drawings:
Figure 5: "Goverment" shoud read -- Government --

Column 3,
Line 42, "applies" should read -- apply --

Column 4,
Line 44, "lizes" should read -- lize --
Line 50, "create" should read -- creates --

Column 7,
Line 23, "issue" should read -- issuer --
Line 24, firther" should read -- further --

Signed and Sealed this

Eighteenth Day of June, 2002

*Attest:*

JAMES E. ROGAN
*Attesting Officer*  *Director of the United States Patent and Trademark Office*